G. W. RAWSON.
MEAT-CUTTER.
No. 170,898.            Patented Dec. 7, 1875.
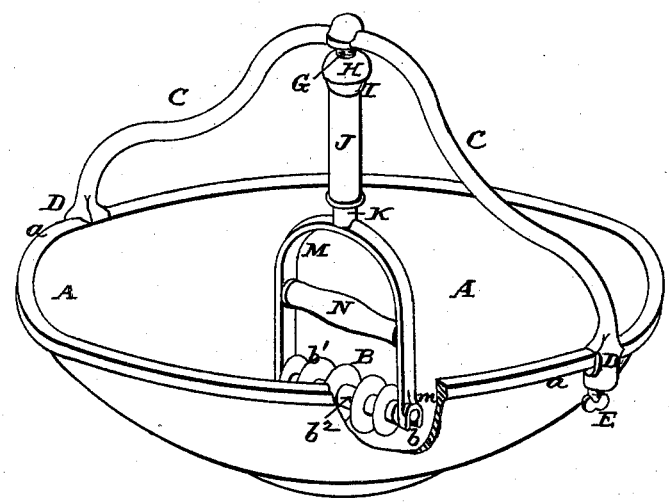
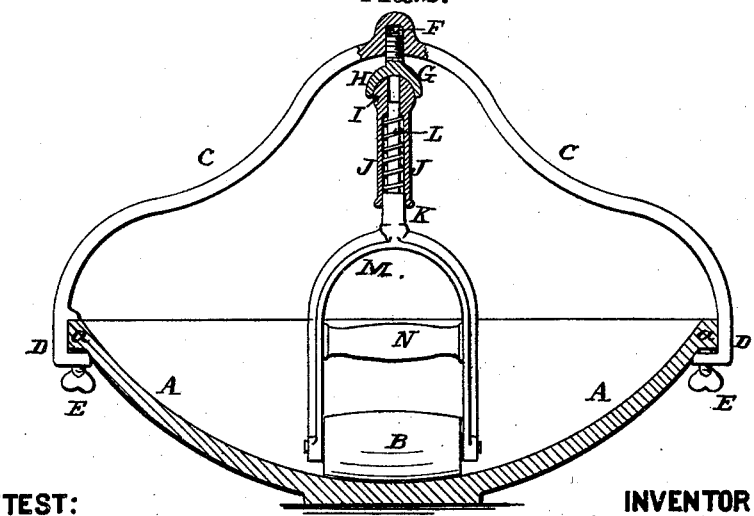
ATTEST:  
Robt. Burns.  
Charles Pickles.
INVENTOR:  
George W. Rawson  
By Knight Bro's  
Atty.

UNITED STATES PATENT OFFICE.

GEORGE W. RAWSON, OF BELLEVILLE, ILLINOIS, ASSIGNOR OF TWO-THIRDS HIS RIGHT TO JABEZ J. PIGGOTT, OF ST. LOUIS, MISSOURI, AND NATHAN T. BAKER, OF BELLEVILLE, ILLINOIS.

IMPROVEMENT IN MEAT-CUTTERS.

Specification forming part of Letters Patent No. 170,898, dated December 7, 1875; application filed June 11, 1875.

*To all whom it may concern:*

Be it known that I, GEORGE W. RAWSON, of Belleville, St. Clair county, Illinois, have invented a certain Improved Cutter for Meat, &c., of which the following is a specification:

This improvement consists of a wooden bowl turned in the form of a section of a sphere. A bail is attached to the edge of the bowl by screw-clips at the ends. The socket member of a ball-and-socket joint screws into the center of the bail, and the ball member of the joint carries a socket, in which turns the spindle of a fork, whose lower ends give journal-bearing to a cutter-roller, above which is a handle, by which the roller is carried over the interior surface of the bowl to cut or mash the contents. The roller is forced downward by a spiral spring in the spindle-socket.

In the drawings, Figure 1 is a perspective view, showing the roller armed with circular knives. Fig. 2 is a vertical section, showing a plain roller.

A is the bowl, in the section of a sphere, so that the roller B, carried on an arm turning on a ball-and-socket joint at the center of an imaginary sphere, of which the bowl is a section, will press with equal force at all points of the bowl. C is the bail, whose ends have clamping-jaws D, supplied with set-screws E, whose points press against the lower edge of the marginal rib $a$ of the bowl, and hold the bail in position. At the center of the bail is a vertical screw-hole, F, in which screws the stem G of the socket-cup H, forming one member of the ball-and-socket joint, of which I forms the ball. The stem J of the ball is tubular at the lower end, and constitutes the bearing-socket of the spindle K. At the inner end of the socket is a spiral spring, L, which bears against the end of the spindle, and tends to force it down in its socket. At the lower end of the spindle is a fork, M, whose ends have open bearings $m$ for the gudgeons $b$ of the roller B. Above the roller, and stretching across the fork, is a handle, N, by which the roller is operated. $b^1$ are knives on the roller. These may be circumferential, as shown, or longitudinal. In either case they are preferably made removable for convenience of sharpening. Between the circular knives shown at $b^1$, Fig. 1, are distance-washers $b^2$.

The operation is as follows: The article to be cut or mashed is placed in the bowl, and the roller driven backward and forward across the bowl, at the same time that the bowl is turned with the other hand, so that the material in all parts of the bowl is operated upon.

The roller B may be smooth, as in Fig. 2, or armed with knives, as in Fig. 1, or with points in the latter case, as in Fig. 1.

It is useful for chopping meat or fruit, and, in the former case, for pressing grapes, working butter, &c.

I claim herein as my invention—

1. The bowl A, having marginal rib $a$, and bail C, having clamping-jaws D and set-screws E, in combination with the knuckle-joint H I, forked arm J K, and roller B, all substantially as set forth.

2. The bowl A, roller B, and bail C, in combination with the ball-and-socket joint H I, hollow stem J, forming a housing for the spring L, and spindle K, as and for the purpose set forth.

In testimony of which invention I have hereunto set my hand this 7th of April, 1875.

GEORGE W. RAWSON.

Witnesses:
 SAML. KNIGHT,
 ROBERT BURNS.